(12) United States Patent
Zhuo et al.

(10) Patent No.: US 11,507,458 B2
(45) Date of Patent: Nov. 22, 2022

(54) STORAGE MANAGEMENT METHOD, DEVICE, AND COMPUTER PROGRAM PRODUCT

(71) Applicant: EMC IP Holding Company LLC, Hopkinton, MA (US)

(72) Inventors: Baote Zhuo, Beijing (CN); Jianbin Kang, Beijing (CN); Geng Han, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 46 days.

(21) Appl. No.: 17/314,416

(22) Filed: May 7, 2021

(65) Prior Publication Data

US 2022/0214942 A1 Jul. 7, 2022

(30) Foreign Application Priority Data

Jan. 6, 2021 (CN) .......................... 202110013590.1

(51) Int. Cl.
*G06F 11/00* (2006.01)
*G06F 11/10* (2006.01)
*G06F 11/14* (2006.01)
*G06F 3/06* (2006.01)

(52) U.S. Cl.
CPC ........ *G06F 11/1076* (2013.01); *G06F 3/0619* (2013.01); *G06F 3/0631* (2013.01); *G06F 3/0689* (2013.01); *G06F 11/1435* (2013.01); *G06F 11/1451* (2013.01); *G06F 11/1469* (2013.01)

(58) Field of Classification Search
CPC .. G06F 11/1076; G06F 3/0619; G06F 3/0631; G06F 3/0689; G06F 11/1435; G06F 11/1451; G06F 11/1469
See application file for complete search history.

(56) References Cited

U.S. PATENT DOCUMENTS

| | | | | | |
|---|---|---|---|---|---|
| 5,479,653 | A | * | 12/1995 | Jones | ................... G06F 11/2094 |
| 5,872,906 | A | * | 2/1999 | Morita | ................ G06F 11/1088 |
| | | | | | 714/E11.089 |
| 6,332,204 | B1 | * | 12/2001 | Russell | .............. G11B 20/1883 |
| | | | | | 714/704 |

(Continued)

OTHER PUBLICATIONS

Kang, Jianbin, et al.; "Method, Device, and Program Product for Creating Extent Array in Storage System," U.S. Appl. No. 17/318,359, filed May 12, 2021.

*Primary Examiner* — Loan L. T. Truong
(74) *Attorney, Agent, or Firm* — BainwoodHuang

(57) ABSTRACT

A storage management technique involves: selecting a first disk from a plurality of disks in a storage system as an anchor disk; allocating a first backup slice from the plurality of disks to a redundant array of independent disks (RAID) associated with the first disk, the first RAID including at least a slice allocated from the first disk; and if it is detected that there is an inaccessible disk in the plurality of disks, determining a backup slice for a slice of the inaccessible disk based on the allocation of the first backup slice to the first RAID, for use in data reconstruction of the inaccessible disk. This can ensure that a backup slice can always be successfully determined for slices of an inaccessible disk without introducing additional time complexity.

27 Claims, 12 Drawing Sheets

(56) References Cited

U.S. PATENT DOCUMENTS

| | | | | |
|---|---|---|---|---|
| 6,426,928 | B1* | 7/2002 | Russell | G11B 20/1883 369/53.17 |
| 7,890,791 | B2* | 2/2011 | Fukuyama | G06F 11/008 714/48 |
| 8,826,065 | B2* | 9/2014 | Bartlett | G06F 3/0619 714/6.22 |
| 9,641,615 | B1* | 5/2017 | Robins | G06F 3/0604 |
| 10,013,321 | B1* | 7/2018 | Stern | G06F 11/1076 |
| 10,082,959 | B1* | 9/2018 | Chen | G06F 3/0689 |
| 10,496,316 | B1* | 12/2019 | Proulx | G06F 3/0644 |
| 10,705,907 | B1* | 7/2020 | Ben-Moshe | G06F 3/0619 |
| 11,157,190 | B2 | 10/2021 | Han et al. | |
| 11,163,464 | B1* | 11/2021 | Gao | G06F 3/0619 |
| 11,188,247 | B2 | 11/2021 | Tang et al. | |
| 11,232,005 | B2 | 1/2022 | Lv et al. | |
| 11,287,996 | B2 | 3/2022 | Kang et al. | |
| 11,321,178 | B1* | 5/2022 | Yu | G06F 11/1461 |
| 2005/0262385 | A1* | 11/2005 | McNeill, Jr. | G06F 11/008 714/E11.02 |
| 2008/0244309 | A1* | 10/2008 | Fukuyama | G06F 11/2094 714/6.12 |
| 2012/0096309 | A1* | 4/2012 | Kumar | G06F 11/2094 714/6.22 |
| 2015/0242145 | A1* | 8/2015 | Minamiura | G06F 11/1088 714/6.22 |
| 2017/0024142 | A1* | 1/2017 | Watanabe | G06F 12/00 |
| 2017/0132099 | A1* | 5/2017 | Li | G06F 11/2094 |
| 2017/0322847 | A1* | 11/2017 | Park | G06F 11/2058 |
| 2019/0146875 | A1* | 5/2019 | Harrington | G06F 11/1092 714/6.24 |
| 2019/0391889 | A1* | 12/2019 | Luo | G06F 11/2094 |
| 2020/0004650 | A1* | 1/2020 | Hanko | G06F 11/2094 |
| 2020/0117386 | A1* | 4/2020 | Dong | G06F 3/0608 |
| 2020/0218617 | A1* | 7/2020 | Knestele | G06F 9/5027 |
| 2020/0341874 | A1* | 10/2020 | Zhuo | G06F 3/0659 |
| 2021/0117088 | A1* | 4/2021 | Zhang | G06F 3/0604 |
| 2021/0133062 | A1* | 5/2021 | Liu | G06F 11/2094 |
| 2021/0191619 | A1 | 6/2021 | Dalmatov | |
| 2021/0397517 | A1* | 12/2021 | Sharma | G06F 11/1096 |
| 2021/0406130 | A1* | 12/2021 | Jorapur | G06F 11/1458 |
| 2022/0006613 | A1* | 1/2022 | Hetzler | H04L 9/3263 |
| 2022/0058044 | A1* | 2/2022 | Ono | G06F 9/4416 |

\* cited by examiner

STORAGE MANAGEMENT METHOD, DEVICE, AND COMPUTER PROGRAM PRODUCT

CROSS-REFERENCE TO RELATED APPLICATION

This application claims priority to Chinese Patent Application No. CN202110013590.1, on file at the China National Intellectual Property Administration (CNIPA), having a filing date of Jan. 6, 2021, and having "STORAGE MANAGEMENT METHOD, DEVICE, AND COMPUTER PROGRAM PRODUCT" as a title, the contents and teachings of which are herein incorporated by reference in their entirety.

TECHNICAL FIELD

Embodiments of the present disclosure generally relate to storage systems, and more particularly, to a method, an electronic device, and a computer program product for storage management.

BACKGROUND

Redundant Array of Independent Disks (RAID) technology is a data storage virtualization technology which is usually used to provide a variety of features such as data redundancy and performance improvement. With the development of the RAID technology, a RAID performs data reading and writing at the slice level of a disk instead of the disk level. Specifically, each of a plurality of disks of a storage system is divided into a plurality of slices. A RAID is created based on multiple slices of different disks, so as to read data therefrom or write data thereto by using a RAID algorithm. Generally, some slices in the storage system are reserved as a backup space to deal with failures. In this way, when a certain disk fails, a slice can be allocated from the backup space for data of the failed disk, thereby avoiding the loss of user data.

At present, there are problems when using a backup space, such as high complexity and difficulty in achieving optimal backup. Therefore, a more optimized backup space management solution is still needed.

SUMMARY OF THE INVENTION

The embodiments of the present disclosure relate to a solution for storage management.

In a first aspect of the present disclosure, a method for storage management is provided. The method includes: selecting a first disk from a plurality of disks in a storage system as an anchor disk; allocating a first backup slice from the plurality of disks to a redundant array of independent disks (RAID) associated with the first disk, the first RAID including at least a slice allocated from the first disk; and if it is detected that there is an inaccessible disk in the plurality of disks, determining a backup slice for a slice of the inaccessible disk based on the allocation of the first backup slice to the first RAID, for use in data reconstruction of the inaccessible disk.

In a second aspect of the present disclosure, an electronic device is provided. The electronic device includes at least one processor and at least one memory storing computer program instructions. The at least one memory and the computer program instructions are configured to cause, along with the at least one processor, the electronic device to perform actions. The actions include: selecting a first disk from a plurality of disks in a storage system as an anchor disk; allocating a first backup slice from the plurality of disks to a redundant array of independent disks (RAID) associated with the first disk, the first RAID including at least a slice allocated from the first disk; and if it is detected that there is an inaccessible disk in the plurality of disks, determining a backup slice for a slice of the inaccessible disk based on the allocation of the first backup slice to the first RAID, for use in data reconstruction of the inaccessible disk.

In a third aspect of the present disclosure, a computer program product is provided. The computer program product is tangibly stored in a computer-readable storage medium and including computer-executable instructions that, when executed by a processor of a device, cause the device to perform the method of the first aspect.

It should be understood that the content described in the Summary of the Invention section is neither intended to limit key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the embodiments of the present disclosure will become easily understandable by reading the following detailed description with reference to the accompanying drawings. In the accompanying drawings, several embodiments of the present disclosure are shown by way of example instead of limitation, where.

Throughout all the accompanying drawings, the same or similar reference numerals are used to indicate the same or similar components.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles and spirits of the present disclosure will be described below with reference to some example embodiments shown in the accompanying drawings. It should be understood that these specific embodiments are described only for the purpose of enabling a person skilled in the art to better understand and then implement the present disclosure, instead of limiting the scope of the present disclosure in any way.

Figure 1:
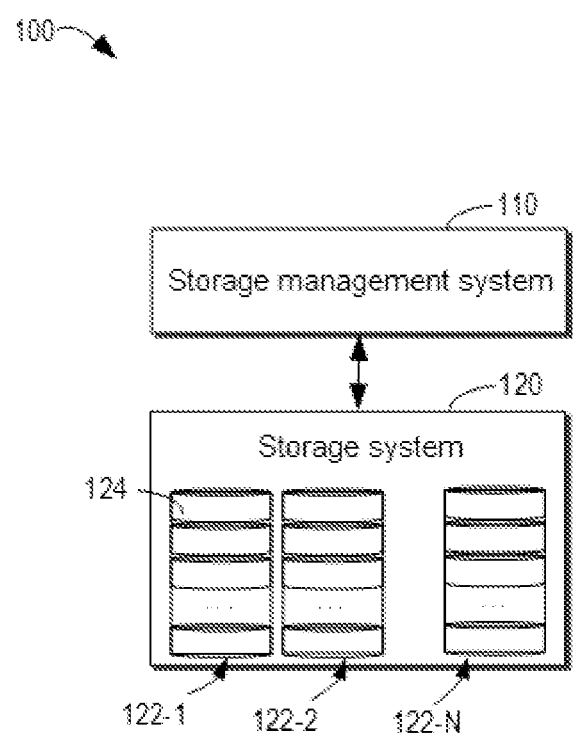
FIG. 1 shows a block diagram of an example storage environment in which an embodiment of the present disclosure may be implemented.

FIG. 1 shows a schematic diagram of example storage environment 100 in which an embodiment of the present disclosure may be implemented. As shown in FIG. 1, storage environment 100 includes storage management system 110 and storage system 120.

Storage system 120 includes a plurality of disks 122-1, 122-2, 122-3, ..., 122-N (N is an integer greater than or equal to 1), etc. for providing a physical storage space of storage environment 100. For ease of discussion, these disks are sometimes referred to collectively or respectively as disk 122. Disk 122 may include various types of devices having a storage function, including but not limited to a hard disk drive (HDD), a solid state disk (SSD), a removable disk, a compact disk (CD), a laser disk, an optical disk, a digital versatile disk (DVD), a floppy disk, a blu-ray disk, a serial-attached small computer system Interface (SCSI) disk (SAS), a serial advanced technology attachment (SATA) disk, any other magnetic storage devices and any other optical storage devices, or any combination thereof. Storage management system 110 is configured to control and manage storage system 120, including storage space allocation, data access, data reconstruction, data backup, etc. for storage system 120.

In a storage system based on a Redundant Array of Independent Disks (RAID), various RAID algorithms may be used to organize a plurality of disks 122. In some embodiments, in order to obtain higher reliability, the number of disks involved in a data reconstruction process may be limited. Therefore, a limited number of multiple disks in storage system 120 may be determined as a RAID Resiliency Set (RRS for short). A plurality of RAIDs can be created on a RRS. For example, each RRS can be set to include 25 disks. If the number of disks 122 included in storage system 120 exceeds 25, multiple RRSs can be further created. Data reconstruction of disk 122 between different RRSs is separated.

Generally, each disk 122 is divided into a plurality of slices or a plurality of extents 124. Such division may be a logical division. The size of slice 124 depends on the capacity and the division manner of disk 122. For example, one disk slice 124 may be of 4 GB. Certainly, other extent sizes are also possible according to actual deployment needs.

A RAID can be constructed at the slice 124 level. The RAID constructed at the slice level, sometimes also referred to as a RAID block or Uber, can also be used for data storage and access according to a conventional RAID technology. Each RAID is allocated with a plurality of slices 124 from different disks 122 for storing information, including user data and possible parity information. In an example embodiment based on RRS, slices allocated for each RAID may come from different disks 122 in the same RRS.

Figure 2:
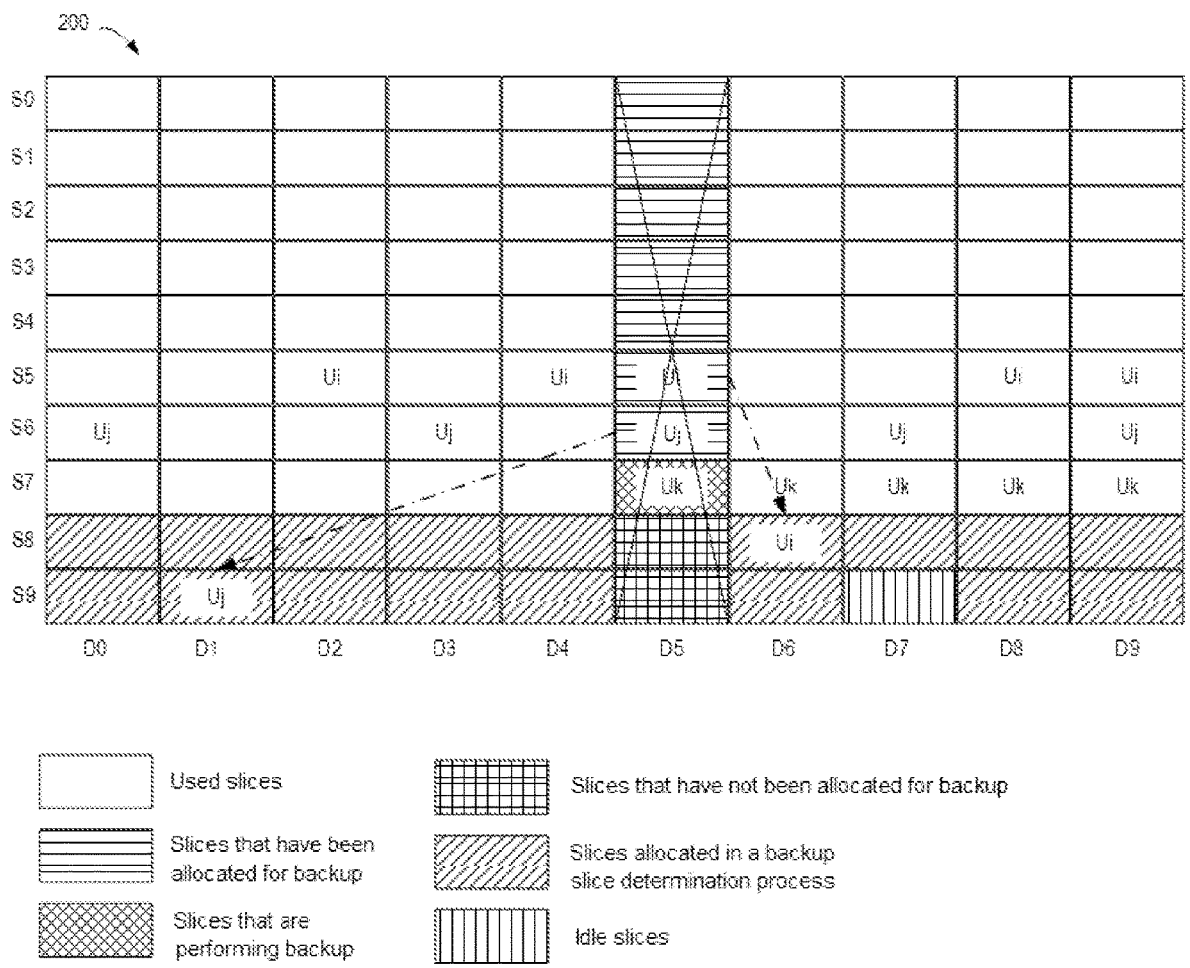
FIG. 2 shows an example of allocating a backup slice for an inaccessible disk in a storage system.

The number of slices included in each RAID depends on the type of the RAID so as to provide different levels of data redundancy and recovery capabilities. Types of the RAID include RAID 2, RAID 3, RAID 4, RAID 5, RAID 6, RAID 7, RAID 10, etc. In FIG. 2 and hereinafter, for the purpose of explanation, the 4+1 RAID 5 type is adopted to discuss the example embodiments of the present disclosure. RAID 5 includes 5 slices 124 for storing user data and parity information. If slice 124 is of 4 GB, the size of RAID 5 is 16 GB. However, it should be understood that the example embodiments of the present disclosure may be similarly applied to any other types of RAIDs.

If disk 122 of storage system 120 becomes offline due to a failure or being unplugged, disk 122 becomes an inaccessible disk. If one or more of the inaccessible disks are allocated to one or more RAIDs for storage, these RAIDs can be marked as degraded RAIDs. Depending on the type of a RAID, a degraded RAID may also continue to be used for data storage. For example, RAID 5 supports continuous operations even when one of its slices is located on an inaccessible disk.

Generally, a certain amount of backup space is reserved in storage system 120, and this part of backup space is idle and is not allocated to a RAID for storage. When there is an inaccessible disk in storage system 120, in order to ensure that data is not lost, storage management system 110 will start a backup task to determine backup slices for slices in inaccessible disk 122 from the backup space for data reconstruction. The slices for which backup slices are to be determined are those slices in inaccessible disk 122 that are allocated to RAIDs for storing information. In some implementations, when certain disk 122 becomes offline, storage management system 110 will start a backup timer. After a debounce time of the backup timer expires, storage management system 110 starts a backup task.

It should be understood that FIG. 1 only schematically shows units, modules, or components in storage environment 100 that are related to the embodiments of the present disclosure. Various components shown in FIG. 1 are merely an example storage system management architecture, and in other RAID-based storage systems, there may be other architecture division manners, other units, modules, or components for other functions, and the like. Accordingly, the embodiments of the present disclosure are not limited to specific devices, units, modules, or components depicted in FIG. 1, but are generally applicable to any storage system based on the RAID technology. The various components shown in FIG. 1 (except disk 122) may be implemented in a single or multiple computing devices.

According to a conventional solution, when performing a backup task, a round-robin method is used to determine backup slices from a backup space for slices in an inaccessible disk one by one. An example backup slice determination process is as follows.

For a slice in the inaccessible disk that is allocated to a RAID for storing information, an idle slice is selected from the backup space as the backup slice. The backup slice needs to come from a destination disk different from those of other slices of the RAID, so as to ensure that the plurality of slices of the RAID are still distributed in different disks after data reconstruction. With the allocation of backup slices, for a certain slice (e.g., DSj) in an inaccessible disk, a destination disk may not be found. The destination disk has idle slices and no slices are allocated to the RAID which includes DSj (assumed to be represented as RAIDj). In this case, it is necessary to backtrack the round-robin process again to find backup slice DSi and associated RAIDi thereof. DSi and RAIDi to be found must meet two conditions. First, DSi can be allocated as a backup slice of DSj. In other words, no other slices in the disk where DSi is located is allocated to RAIDj. Secondly, a backup slice can be determined from other disks to replace DSj as a backup slice for a slice in RAIDi.

For example, assume that the storage system has 10 disks, which are respectively represented as D0, D1, D2, . . . , D9, and the type of the RAID created in them is RAID 5. If disk D5 is offline, a degraded RAIDi includes slices allocated from disks D1, D2, D3, D4, and D5. The backup slice from disk D0 is allocated to the slice allocated from D5 in RAIDi. Another degraded RAIDj includes slices allocated from disks D5, D6, D7, D8, and D9. When selecting a backup slice for the slice allocated from D5 in RAIDj, only disk D7 has idle slices. Since RAIDj has included a slice allocated from D7, idle slices on D7 cannot be selected as a backup slice. By backtracking the backup history, it is found that slices of RAIDi can be backed up to D7, and RAIDj can use the backup slices from disk D0 that are previously allocated for RAIDi. Therefore, backup slices are allocated again for RAIDi from disk D7, and idle slices on D0 are allocated to RAIDj.

According to a conventional round robin-based backup algorithm, it may be impossible to determine backup slices for some degraded RAIDs, even if the storage system still has enough idle slices currently. Although it can be remedied by going back to the backup steps, it still cannot address all situations.

Take FIG. 2 as an example for description. In storage system 200 shown in FIG. 2, it is assumed that 10 disks are stored, which are represented as D0, D1, D2, . . . , D9, respectively. Each disk is divided into 10 slices S0, S1, S2, . . . , S9. For convenience of description, a disk number and a slice number DS(X, Y) is used to indicate slice Y in disk X. For example, DS(0, 0) refers to slice S0 in disk D0, DS(2, 3) refers to slice S3 in disk D2, and so on. Ux marked on a slice indicates that the slice is allocated to RAIDx for storing information.

In FIG. 2, it is assumed that disk D5 is inaccessible due to a failure. Through the backup process, backup slice DS(6, 8) in disk D6 is allocated for slice Ui located on disk D5 in RAIDi, and backup slice DS(1, 9) in disk D1 is allocated for slice Uj located on disk D5 in RAIDj. When determining a backup slice for slice Uk located on disk D5 in RAIDk, only slice DS(7, 9) on disk D7 is idle. But slice DS(7, 9) cannot be selected because slice DS(7, 7) on disk D7 has been allocated to RAIDk for information storage. In this case, if only one step back is taken to analyze RAIDj and slice DS(1, 9), it is still impossible to find a backup slice for RAIDk, because the idle slice on disk D7 cannot be allocated to RAIDk either.

At this moment, in the example in FIG. 2, only by taking the backup process back two steps, can it be found that idle slice DS(7, 9) on disk D7 may be allocated to RAIDi, and idle slice DS(6, 8) in disk D6 may be allocated to RAIDj, so that slice DS(1, 9) on disk D1 can be finally allocated to RAIDk.

According to the conventional round-robin method, in some special cases, it may further need to go back 3 or even more steps to determine the optimal backup slice allocation solution. It is assumed that the number of storage disks in a storage system (or a restricted RRS for data reconstruction) is N, the number of slices to be used for each RAID is S, and the number of steps to be gone back is M (the range of M is [1, S−1]). The time complexity of viewing the backup history will be $O(S^M)$. The total time complexity is $O(S^M)$+ $O(S*N)$. Therefore, if there is more than one step to be gone back, the time complexity and the computational complexity are often unacceptable.

The inventor of this application attempts to simulate all possible combinations of round-robin backup steps in some conventional storage systems. In different situations where the maximum number of disks in a RRS is 25 and the total number of disks in a storage system is, for example, 428, 856, 1712, 3424, 6848, etc., the inventor found that there are a certain number of round-robin backup combinations that cannot find the optimal backup slice allocation by going back only one step, leading to the failure of backup slice allocation.

Therefore, an improved solution for storage management is proposed in the present disclosure. According to this solution, an anchor disk is determined among a plurality of disks of a storage system. A RAID associated with the anchor disk is allocated with a backup slice in advance. The direct allocation of a backup slice for the anchor disk can cope with extreme situations when determining backup slices for an inaccessible disk, thus ensuring that backup slices can always be successfully determined for slices of an inaccessible disk without introducing additional time complexity. In addition, such backup slice allocation does not require more backup space than what is required in a conventional storage system, and no additional space complexity is introduced.

Figure 3:
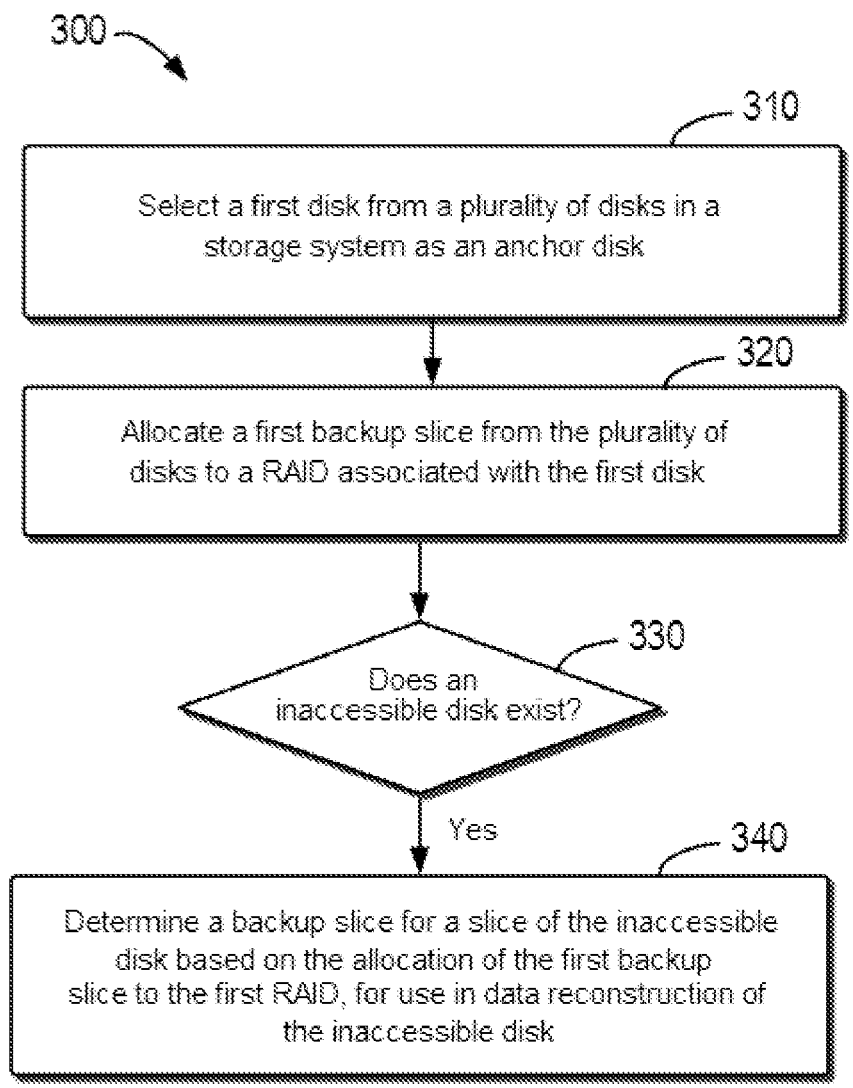
FIG. 3 shows a flow chart of a storage management method according to some embodiments of the present disclosure.

FIG. 3 shows a flow chart of storage management method 300 according to an embodiment of the present disclosure. In some embodiments, method 300 may be implemented at storage management system 110. For ease of description, reference will be made below to storage environment 100 in FIG. 1.

At block 310, storage management system 110 selects a first disk from a plurality of disks 122 of storage system 120 as an anchor disk. In some embodiments, for a RRS with a limited number of disks, an anchor disk for the RRS may be selected from a plurality of disks 122 of the RRS.

In some embodiments, the anchor disk may be selected as disk 122 with a relatively high storage capacity. Storage management system 110 may select a first disk as the anchor disk based on corresponding storage capacities of the plurality of disks 122, so that the storage capacity of the selected first disk is greater than the storage capacity of at least one other disk. In one example, disk 122 with the largest storage capacity may be selected as the anchor disk. In other examples, a disk with a high storage capacity ranking (for example, disk 122 with the second largest or third largest storage capacity) may also be selected as the anchor disk. In some cases, the anchor disk may be selected from disks 122 whose storage capacities are greater than a predetermined threshold. A high storage capacity is beneficial to reservation of more idle slices from the anchor disk for use in a backup slice determination process when an inaccessible disk occurs.

At block 320, storage management system 110 allocates a backup slice (sometimes referred to as a "first backup slice") from a plurality of disks 122 to a RAID associated with the first disk that is selected as the anchor disk. The RAID associated with the first disk serving as the anchor disk refers to a RAID including at least a slice allocated from the first disk. Since the RAID associated with the first disk is allocated with a backup slice, it can also be referred to as a directly backupable RAID.

The allocation of a backup slice may be performed when a RAID is created in storage system 120. In addition to allocating for a RAID storage slices that are originally used for information storage, if the RAID is associated with the anchor disk, a backup slice is also allocated for the RAID. In some embodiments, the backup slice allocated for the RAID that is associated with the first disk and a plurality of slices allocated for the RAID disk for storing information may be located on different disks 122. In some embodiments, the RAID associated with the first disk may include storage slices allocated from the first disk for storing information. For example, RAID 5 includes 5 storage slices for storing information (including user data and parity information), and one slice therein can come from the first disk. For such RAID 5, a backup slice may be allocated to RAID 5 from other disks among the plurality of disks, and the backup slice and the five storage slices of RAID 5 are located on different disks 122. In some embodiments, the RAID associated with the first disk may include a backup slice allocated from the first disk. The storage slices allocated to the RAID for storing information may come from disks other than the first disk.

Figure 4:
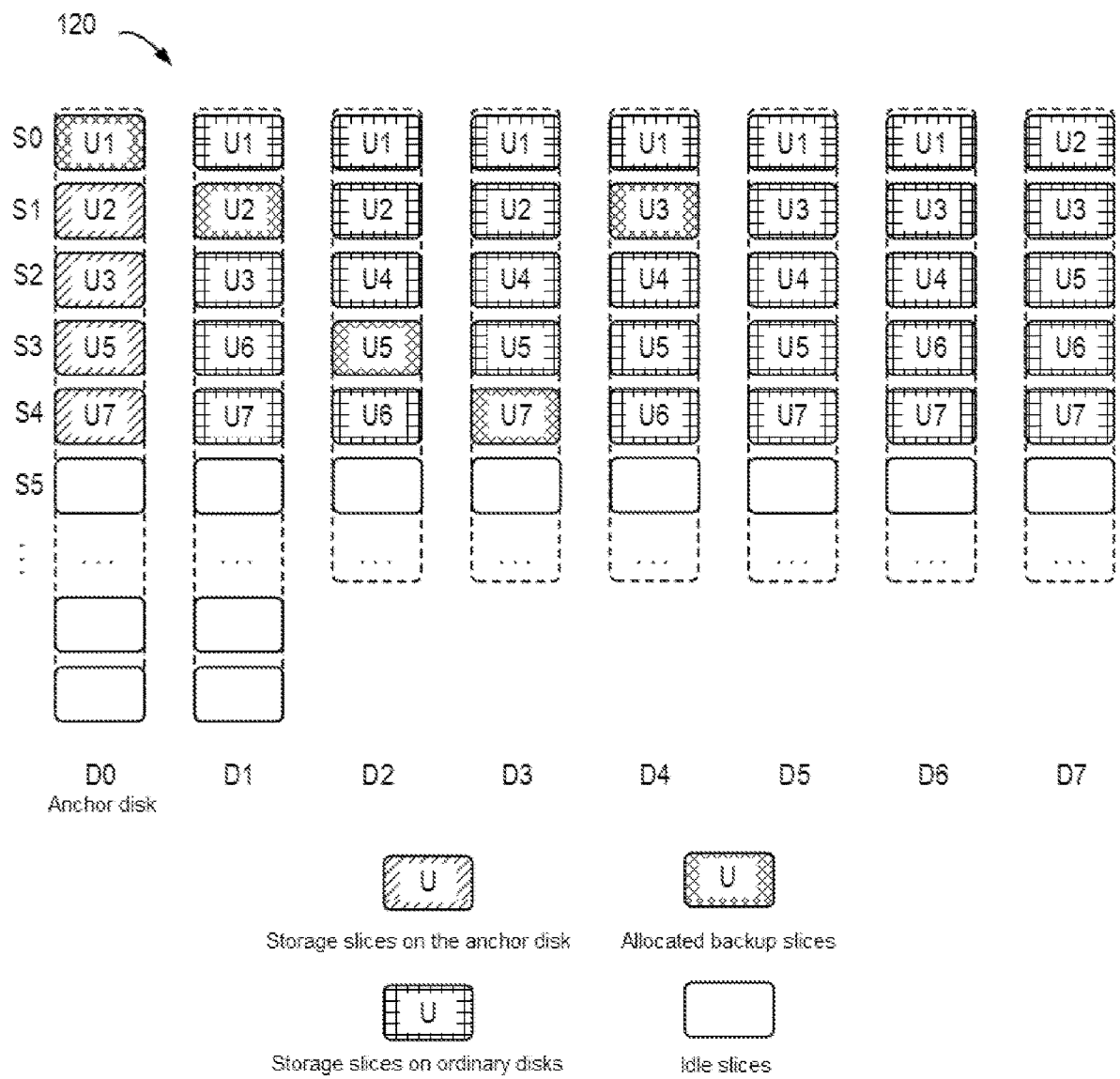
FIG. 4 shows an example of allocating a backup slice for an anchor disk according to some embodiments of the present disclosure.

FIG. 4 shows an example of allocating a backup slice for an anchor disk in storage system 120 according to some embodiments of the present disclosure. It is assumed that storage system 120 includes 8 disks, which are represented as D0, D1, D2, . . . D7, respectively. Each disk is divided into slices, which are respectively represented as S0, S1, S2, . . . , and so on. The number of slices divided from each disk depends on the unit size of the slices and the storage capacity of the disk itself. Similar to FIG. 2, when describing FIG. 4 and subsequent similar drawings, for convenience, a disk number and a slice number DS(X, Y) is used to indicate slice Y in disk X. For example, DS(0, 0) refers to slice S0 in disk D0, DS(2, 3) refers to slice S3 in disk D2, and so on. Ux marked on a slice indicates that the slice is a slice allocated to RAIDx, which can be a storage slice for storing information or a backup slice. In the example in FIG. 4, 4+1 RAID 5 is taken as an example.

In FIG. 4, it is assumed that disk D0 is selected as the anchor disk. Disks other than the anchor disk (e.g., disks D1 to D7) may be referred to as ordinary disks. Slice D(0, 0) in anchor disk D0 is allocated as a backup slice for RAID 1 marked with "U1." Therefore, RAID 1 is associated with anchor disk D0 and is a directly backupable RAID. RAID 1 is also allocated with slices in disks D1, D2, D3, D4, and D5 for storing information.

For RAID 2, RAID 3, RAID 5, and RAID 7 marked with "U2," "U3," "U5," and "U7," storage slices DS(0, 1), DS(0, 2), DS(0, 3), and DS(0, 4) for storing information are respectively allocated for these RAIDs from the first disk, and therefore, backup slices DS(1, 1), DS(2, 3), DS(3, 4), and DS(4, 1) are also allocated for these RAIDs respectively.

In some embodiments, if there are a plurality of RAIDs associated with the anchor disk, when allocating backup slices for the plurality of RAIDs in the plurality of disks 122, the plurality of backup slices are caused to be substantially uniformly distributed among the plurality of disks 122. When not used for data reconstruction, the backup slices are idle. If too many idle backup slices are concentrated in a single or a few disks, the frequency of accessing this or these disks may decrease because this or these disks do not store more data. Therefore, the uniform distribution of backup slices helps to make the access operations as uniformly distributed among the plurality of disks 122 as possible.

In some embodiments, after allocating backup slices, storage management system 110 may also generate and store metadata for the RAID associated with the anchor disk. The metadata marks the RAID associated with the anchor disk as directly backupable. The metadata can also mark a backup slice allocated to the directly backupable RAID. In this way, in the subsequent process, especially when a backup slice needs to be determined when an inaccessible disk occurs, storage management system 110 may perform a backup slice determination process based on the metadata.

At block 330, storage management system 110 detects whether there is an inaccessible disk in the plurality of disks 122. Disk 122 may become offline due to a failure or being unplugged or other reasons. Such disk is inaccessible.

If there is no inaccessible disk, storage system 120 can continue to operate normally. If it is detected that there is an inaccessible disk in the plurality of disks, at block 340, storage management system 110 determines a backup slice for a slice of the inaccessible disk based on the allocation of a first backup slice to the RAID associated with the anchor disk, for use in data reconstruction of the inaccessible disk.

Due to the previous allocation of a backup slice for the RAID, when data reconstruction needs to be performed on the inaccessible disk, the determination of a backup slice will become simple. Depending on whether the inaccessible disk is an anchor disk and the idle slices are available for backup in the plurality of disks 122, there may be different ways to determine a backup slice.

In some embodiments, if an inaccessible disk appears in storage system 120, storage management system 110 determines one or more degraded RAIDs affected by the failure or offline of the inaccessible disk. A degraded RAID refers to a RAID that includes a storage slice allocated from an inaccessible disk for storing information. Since a storage slice from an inaccessible disk can no longer support data access, data access to the degraded RAID may be affected. A backup slice needs to be allocated for the degraded RAID to reconstruct information originally stored in a storage slice in the inaccessible disk to the backup slice.

An example of determining a backup slice will be described below in conjunction with FIG. 5, FIG. 6A, and FIG. 6B, respectively.

In some embodiments, if a degraded RAID is a directly backupable RAID, that is, a backup slice has been previously allocated for the degraded RAID, storage management system 110 may directly determine the backup slice previously allocated to the RAID as a backup slice of a storage slice included in the inaccessible disk of the degraded RAID. Storage management system 110 may use created associated metadata to determine whether the degraded RAID is a directly backupable RAID. As a directly backupable RAID, the degraded RAID may include a storage slice allocated from the anchor disk for information storage or may include a backup slice allocated from the anchor disk.

Figure 5:
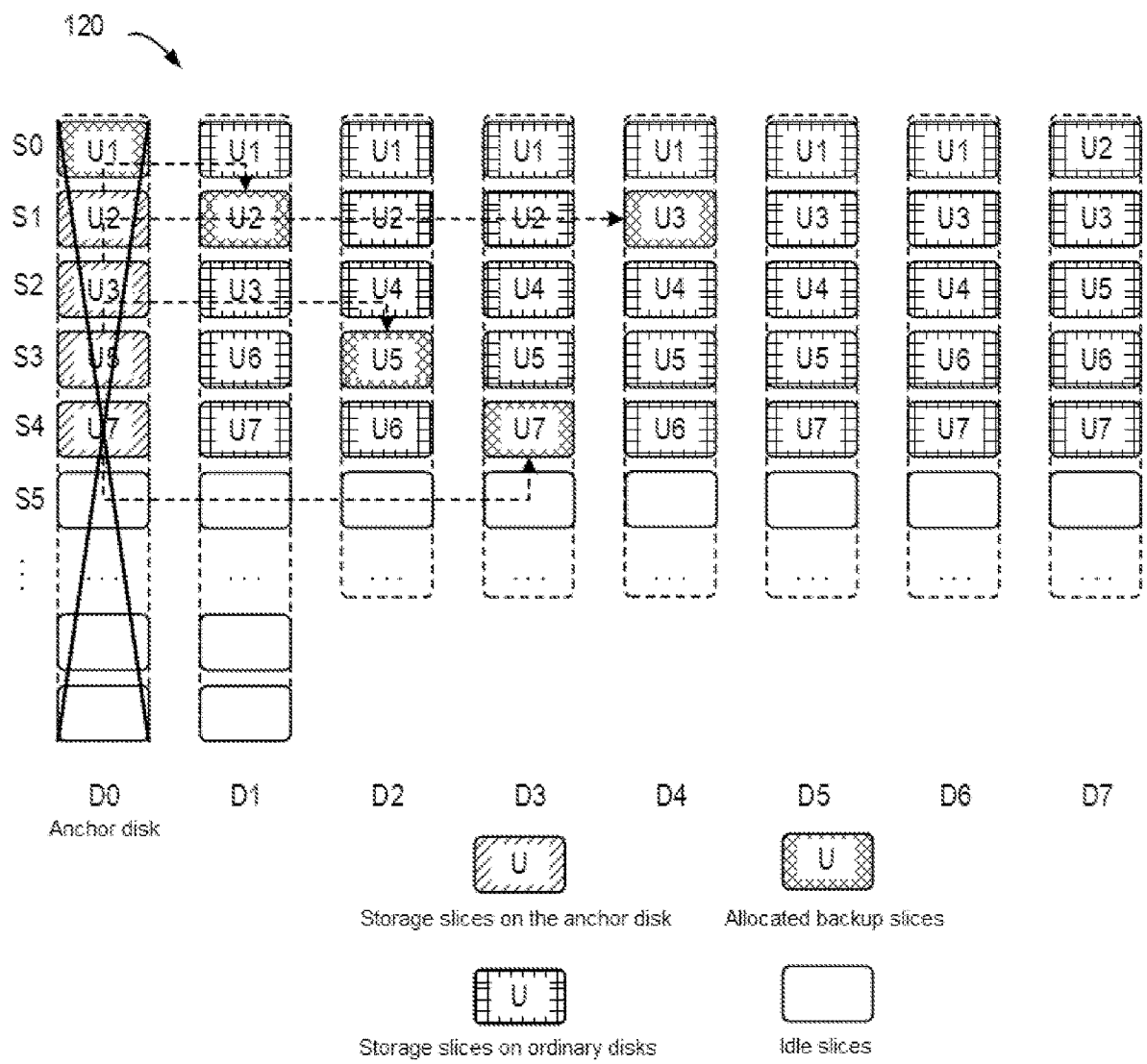
FIG. 5 shows an example of determining a backup slice for an anchor disk according to some embodiments of the present disclosure.

FIG. 5 shows an example of determining a backup slice for an anchor disk according to some embodiments of the present disclosure. This example continues with the backup slice allocation of FIG. 4. In the example of FIG. 5, it is assumed that anchor disk D0 is inaccessible. Affected by the inaccessibility of anchor disk D0, RAID 2, RAID 3, RAID 5, and RAID 7 become degraded RAIDs. Since these RAIDs are all associated with the anchor disk, backup slices have been allocated to these RAIDs previously. Storage management system 110 directly determines the previously allocated backup slices DS(1, 1), DS(2, 3), DS(3, 4), and DS(4, 1) as backup slices of storage slices DS(0, 1), DS(0, 2), DS(0, 3), and DS(0, 4) included in the inaccessible anchor disk of these RAIDs, respectively.

For slice DS(0, 0) in anchor disk D0, since it is a backup slice of RAID 1, the inaccessibility of anchor D0 will not degrade RAID 1. Therefore, there is no need to determine a backup slice for RAID 1.

Figure 6A:
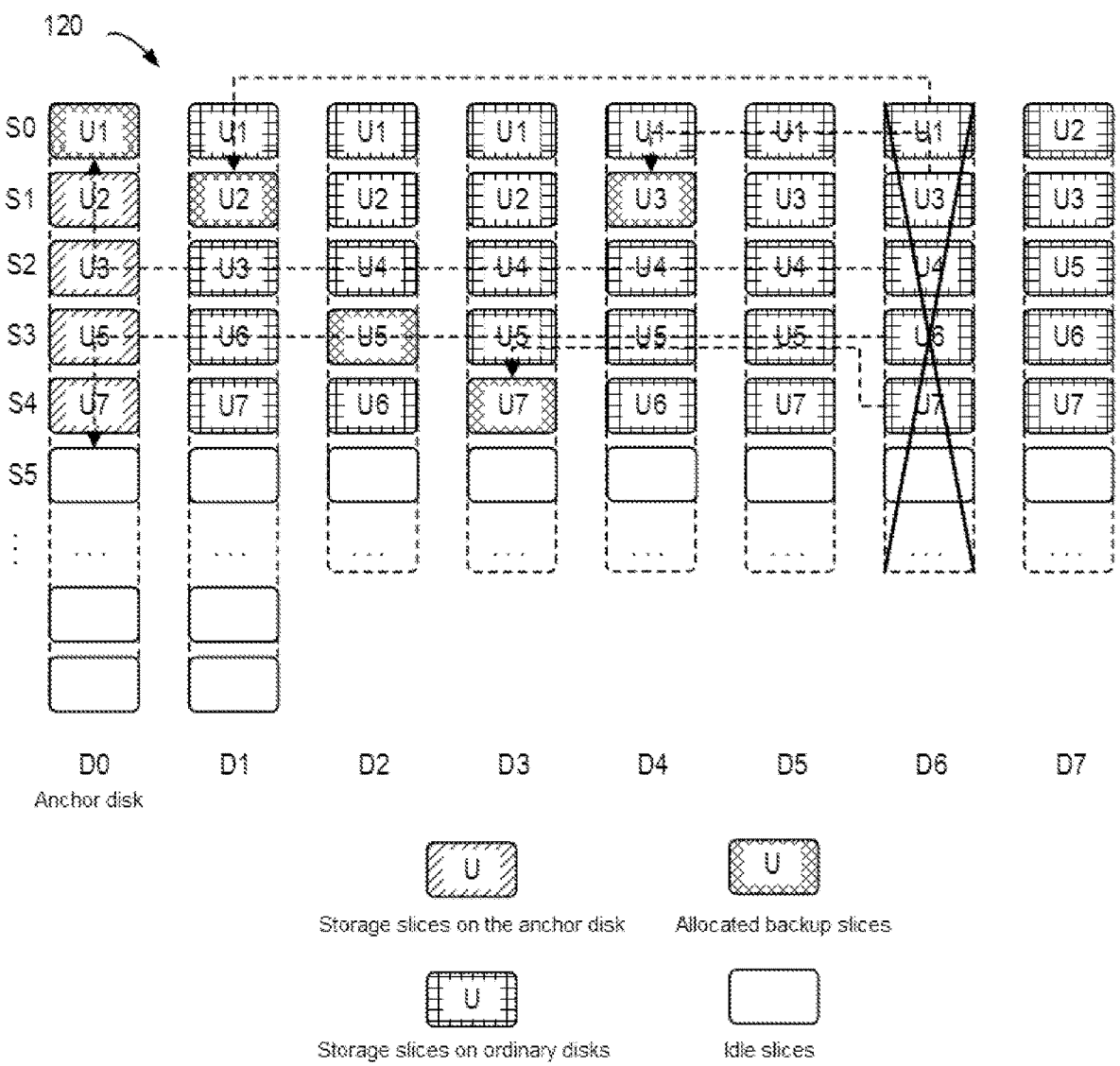
FIG. 6A shows an example of determining a backup slice for an ordinary disk according to some embodiments of the present disclosure.

FIG. 6A shows an example of determining a backup slice for an ordinary disk according to some embodiments of the present disclosure. In the example of FIG. 6A, it is assumed that ordinary disk D6 is an inaccessible disk. RAID 2, RAID 3, RAID 4, RAID 6, and RAID 7 respectively include storage slices DS(6, 0), DS(6, 1), DS(6, 2), DS(6, 3), and DS(6, 4) allocated from D6 for storing information. Therefore, RAID 2, RAID 3, RAID 4, RAID 6, and RAID 7 are marked as degraded RAIDs.

Since RAID 2, RAID 3, and RAID 7 are directly backupable RAIDs, they were previously allocated with backup slices DS(1, 1), DS(4, 1), and DS(3, 4). Therefore, the data management system directly determines the allocated backup slices as respective backup slices of storage slices DS(6, 0), DS(6, 1), and DS(6, 4) included in inaccessible disk D6 of these RAIDs.

In some embodiments, if the degraded RAID is not a directly backupable RAID associated with the anchor disk, storage management system 110 may determine a backup slice for the storage slice of the degraded RAID on the inaccessible disk from the backup space of storage system 120. The disk where the determined backup slice is located needs to be different from the disk where the storage slice included in the degraded RAID is located. In this way, the slices allocated for the degraded RAID are distributed on different disks. For example, in the example of FIG. 6A, for degraded RAID 6 that is not directly backupable, storage management system 110 determines idle slice DS(0, 5) of anchor disk D0 as a backup slice of storage slice DS(6, 2) of RAID 6. in In some embodiments, if there are no unallocated idle slices in the plurality of disks 122 of storage system 120 that can be allocated as a backup slice for an affected storage slice in the degraded RAID, and if the anchor disk is not an inaccessible disk, storage management system 110 may also determine a backup slice for the degraded RAID based on the backup slice previously allocated to the RAID that is associated with the anchor disk. There are no unallocated idle slices in the plurality of disks 122 that can be allocated to the degraded RAID. This may be because there are no idle slices, or because disks with idle slices are not allowed to allocate slices for the degraded RAID due to repeated allocation of the slices. In this case, because the degraded RAID has no backup slices directly available, which means that the degraded RAID does not include slices allocated from the anchor disk, it is always allowed to allocate a backup slice for the degraded RAID from the anchor disk.

In one embodiment, if the backup slice previously allocated to the RAID associated with the anchor disk comes from the anchor disk, storage management system 110 may determine the allocated backup slice in the anchor disk as a backup slice of an affected storage slice in the degraded RAID, although the backup slice was previously allocated to a RAID other than the degraded RAID. For example, in FIG. 6A, DS(0, 0) in the anchor disk can be allocated to slice DS(6, 2) located on inaccessible disk D6 in RAID 4 as a backup slice, although DS(0, 0) was previously allocated as a backup slice of RAID 1.

In some examples, in the case where there are no unallocated idle slices in the plurality of disks 122 that can be allocated as a backup slice of an affected storage slice in the degraded RAID, if the backup slice previously allocated to the RAID associated with the anchor disk comes from disk 122 other than the anchor disk, storage management system 110 may use information migration (for example, through a duplication operation) to enable the allocation of a backup slice from the anchor disk to the degraded RAID. In this case, disk 122 with backup slices may not be able to allocate a backup slice to the degraded RAID due to repeated allocation of slices. For example, one slice has already been allocated to the degraded RAID for storing information. The RAID associated with the anchor disk includes a storage slice for storing information in the anchor disk, so storage management system 110 can migrate the information in the storage slice to a backup slice of the RAID associated with the anchor disk. In this way, storage management system 110 can allocate this slice in the anchor disk to the degraded RAID as a backup slice.

Figure 6B:
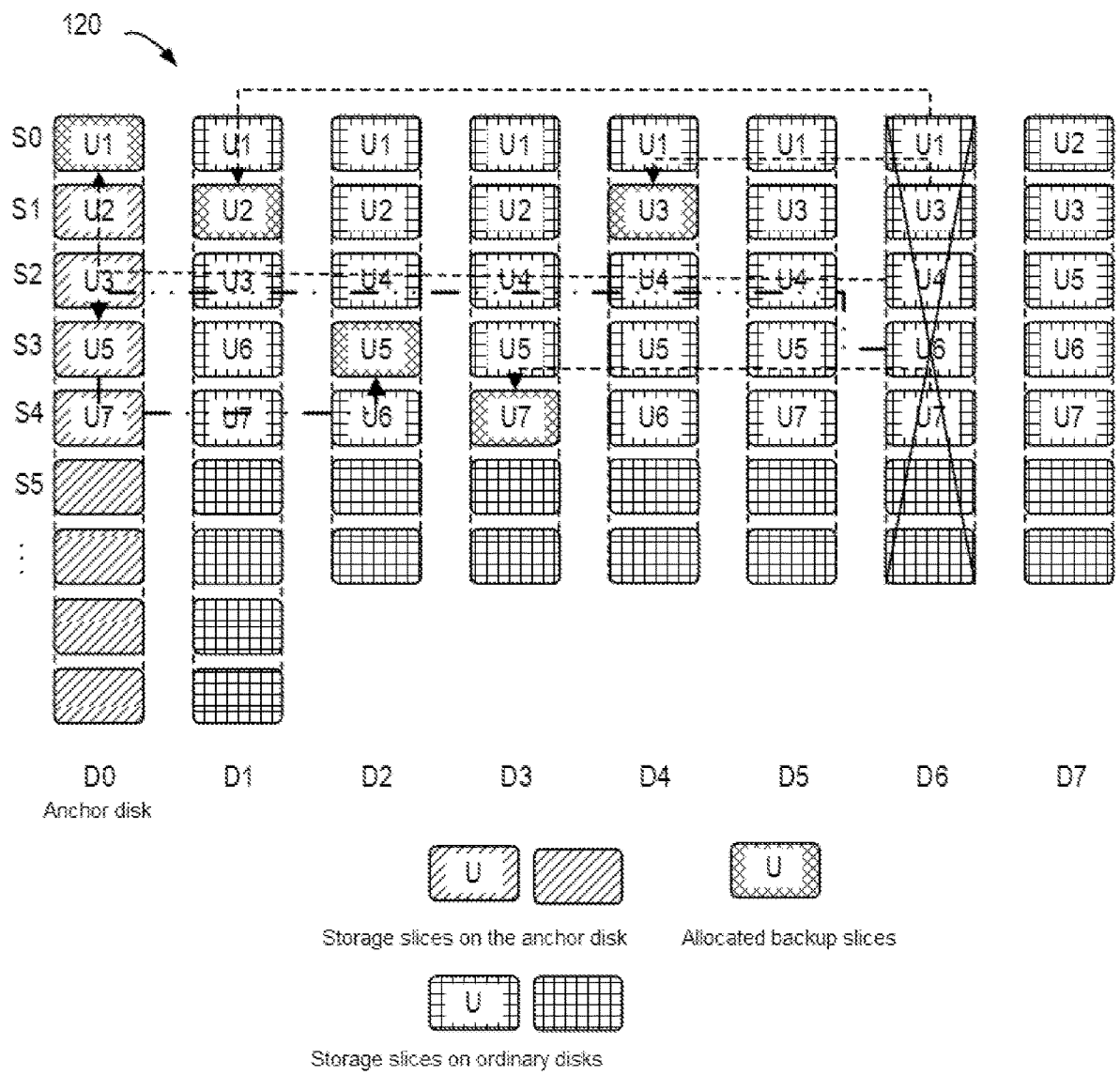
FIG. 6B shows another example of determining a backup slice for an ordinary disk according to some embodiments of the present disclosure.

FIG. 6B shows such special example. In FIG. 6B, it is assumed that none of disks D0 to D7 has idle and unallocated slices. Storage management system 110 determines that slice DS(2, 3) in disk D2 is a backup slice of RAID 5, and the backup slice is not used when an inaccessible disk appears this time. However, degraded RAID 6 with no backup slice allocated cannot directly use slice DS(2, 3) in disk D2, because slice DS(2, 4) of disk D2 has already been allocated to RAID 6. Storage management system 110 can migrate the information stored in slice DS(0, 3) in anchor disk D0 of RAID 5 to DS(2, 3). In this way, DS(0, 3) can be allocated to RAID 6 as a backup slice of DS(6, 3).

Although additional information migration operations are introduced in such backup slice determination, since the probability of occurrence of such extreme cases is low, the overall overhead introduced by the information migration operations is small compared with the reduced complexity of the backup slice allocation process.

In some embodiments, if a disk (sometimes referred to as a "second disk" or "new disk") is added to storage system 120, it may be necessary to re-determine an anchor disk. If the new disk is determined as the anchor disk, the backup slice of the RAID associated with the anchor disk may need to be updated. Whether a new disk is determined as the anchor disk may depend on a comparison between a storage capacity of the new disk and that of a disk currently serving as the anchor disk. If the storage capacity of the new disk is larger than that of the current anchor disk, or the storage capacity of the new disk exceeds that of the current anchor disk by a predetermined threshold amount, storage management system 110 may select the new disk as the anchor disk. Otherwise, the current anchor disk may remain unchanged.

Generally, after adding a disk to storage system 120, storage management system 110 will also perform a re-striping operation on the new disk in storage system 120, so as to re-distribute the originally allocated slices in multiple disks to multiple existing disks and the new disk to achieve uniform distribution of these disks. Depending on the result of the re-striping for the new disk and whether the anchor disk is to be changed to the new disk, storage management system 110 also needs to perform corresponding slice allocation adjustments.

In some embodiments, if the new disk is selected as the anchor disk, storage management system 110 determines a RAID associated with the new disk based on the result of the re-striping for the new disk in storage system 120. The RAID associated with the new disk includes slices in the plurality of existing disks that are re-striped to the new disk. If a re-striped slice in the plurality of existing disks was originally a storage slice used to store information in the anchor disk, storage management system 110 migrates the information in the slice to a slice in the new disk.

Figure 7A:
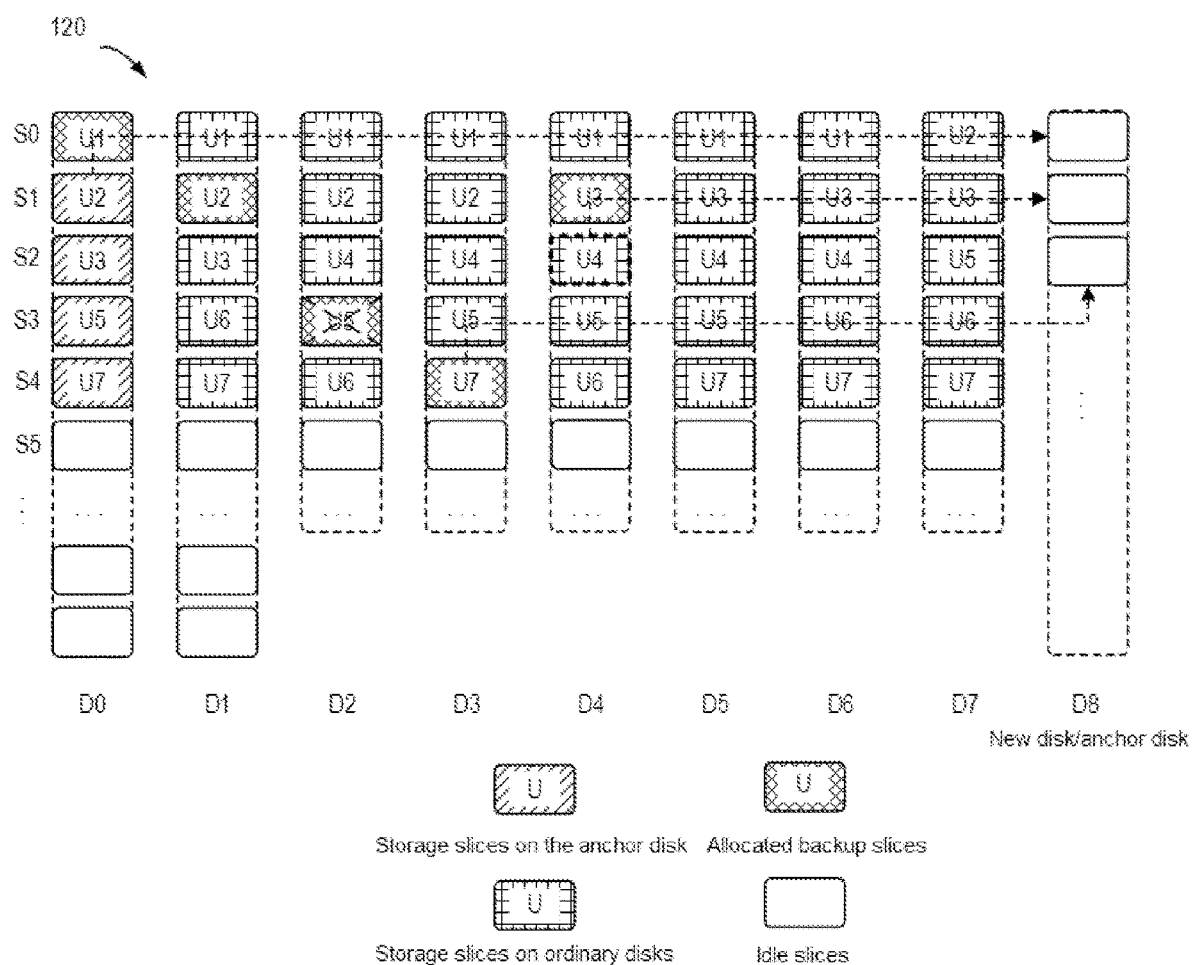
FIG. 7A shows an example of adjusting slice allocation when adding a new disk according to some embodiments of the present disclosure.

FIG. 7A shows an example of adjusting slice allocation when adding a new disk according to some embodiments of the present disclosure. In FIG. 7, disk D8 is added to storage system 120, and disk D8 is selected as the new anchor disk because it has a larger storage capacity. Assume that slice DS(0, 1) in original anchor disk D0 is re-striped to slice DS(8, 0) in new anchor disk D8. Since slice DS(0, 1) is a storage slice used by RAID 2 to store information and RAID 2 is originally a directly backupable RAID and has been allocated with a backup slice, storage management system 110 only needs to migrate the information in slice DS(0, 1) to slice DS(8, 0).

In some embodiments, if a re-striped slice in the plurality of existing disks comes from a disk other than the anchor disk, storage management system 110 migrates the information stored in the slice to a corresponding slice in the new disk and determines this slice as a backup slice of the RAID associated with the new disk. In the example in FIG. 7A, if slice DS(4, 2) is re-striped to DS(8, 1), since slice DS(4, 2) is a storage slice of RAID 4 for storing information, but RAID 4 is not a directly backupable RAID when D0 is the anchor disk, storage management system 110 may also determine a backup slice for RAID 4. Simply, storage management system 110 can determine slice DS(4, 2) whose information has been migrated as a backup slice of RAID 4. Storage management system 110 may also mark RAID 4 as directly backupable by modifying metadata, and also mark the backup slice of RAID 4.

In some embodiments, if a slice re-striped from the plurality of existing disks is a backup slice of the RAID associated with the new disk, storage management system 110 may directly determine a slice in the new disk as the backup slice. In the example in FIG. 7A, if slice DS(3, 4) is re-striped to slice DS(8, 2) in disk D8, since slice DS(3, 4) is a backup slice of RAID 7, storage management system 110 may directly determine re-striped slice DS(8, 2) as a backup slice of RAID 7. For example, storage management system 110 may mark the backup slice of RAID 7 by modifying metadata.

Figure 7B:
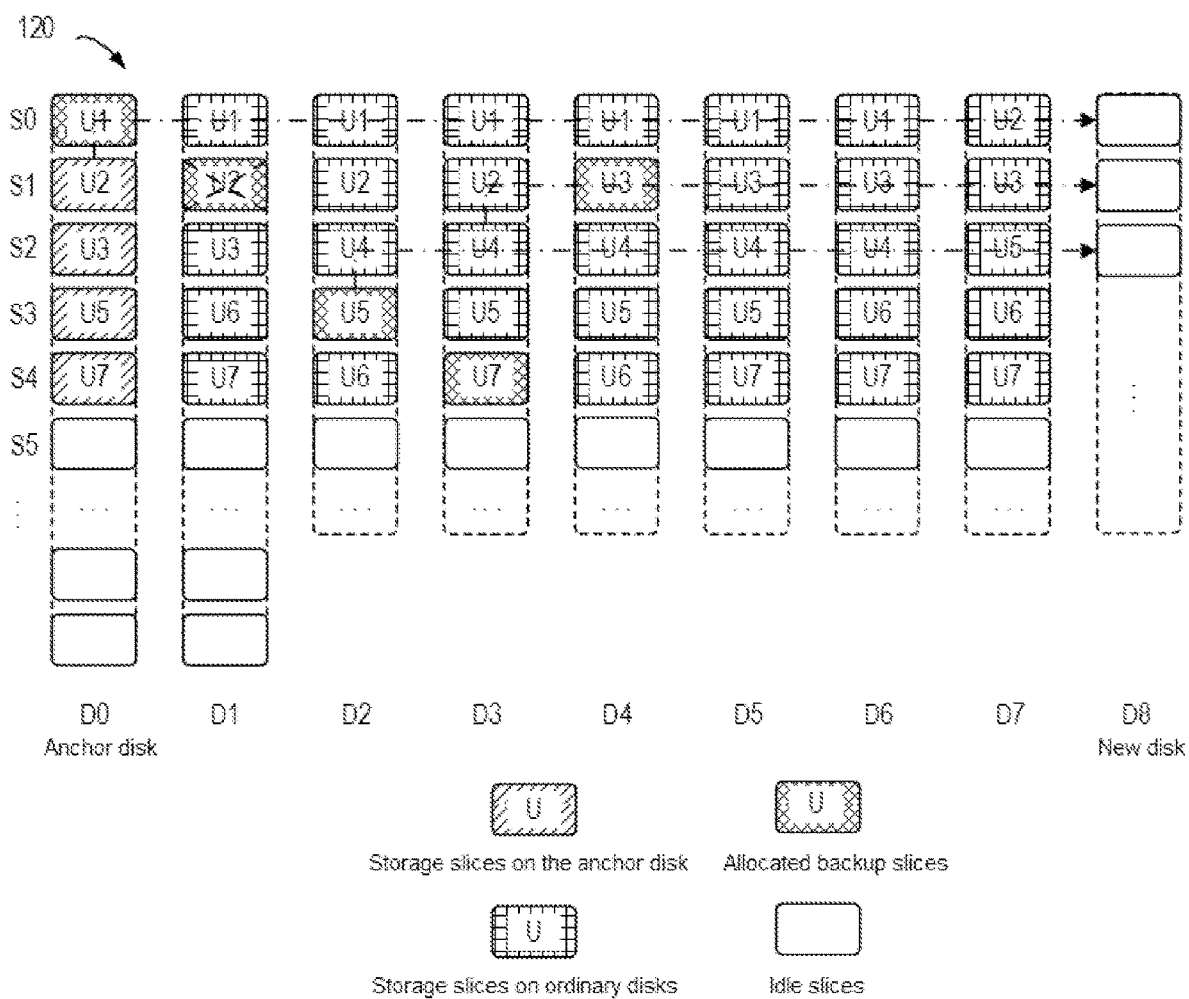
FIG. 7B shows another example of adjusting slice allocation when adding a new disk according to some embodiments of the present disclosure.

In some embodiments, if the original anchor disk in storage system 120 remains unchanged after a new disk is added, storage management system 110 may also need to re-determine the allocation of slices depending on the result of re-striping. FIG. 7B shows another example of adjusting slice allocation when adding a new disk according to some embodiments of the present disclosure. In this example, disk D8 newly added to storage system 120 has a relatively small storage capacity, and disk D0 remains as the anchor disk.

In some embodiments, if the RAID associated with the anchor disk includes a storage slice allocated from the anchor disk, storage management system 110 determines whether the storage slice is re-striped to the new disk while the anchor disk remains unchanged. If the storage slice is re-striped to a slice in the new disk, the RAID is no longer directly backupable. Storage management system 110 may release the backup slice allocated for the RAID.

In FIG. 7B, if slice DS(0, 1) in anchor disk D0 is re-striped to slice D(8, 0) of new disk D8, slice DS(0, 1) is a slice of directly backupable RAID 2, but after re-striping, RAID 2 no longer includes the slice in anchor disk D0 (whether it is a backup slice or a storage slice). Therefore, the backup slice originally allocated to RAID 2 can be released.

In some embodiments, if the anchor disk remains unchanged and a backup slice of the RAID associated with the anchor disk is re-striped to a slice of the new disk, storage management system 110 may determine the re-striped slice in the new disk as a backup slice, and release the original allocation of the backup slice. In the example in FIG. 7B, if slice DS(2, 3) in disk D2 is re-striped to slice DS(8, 2) in new disk D8, since slice DS(2, 3) is a backup slice of directly backupable RAID 5, re-striped slice DS(8, 2) can be determined as a backup slice of directly backupable RAID 5, and slice DS(2, 3) can be released. Storage management system 110 may update metadata associated with RAID 5 accordingly.

In some embodiments, if a storage slice used to store information in an ordinary disk is re-striped to a slice of a new disk, storage management system 110 may migrate the information in the stored information to the slice of the new disk. The slice in the ordinary disk becomes an idle slice. In FIG. 7B, if storage slice DS(3, 2) allocated to RAID 4 for storing information in disk D3 is re-striped to slice DS(8, 1) of disk D8, the information stored in slice DS(3, 2) is migrated to slice DS(8, 1). Slice DS(3, 2) becomes an idle slice.

In some embodiments, after an inaccessible disk appears, the information stored in the inaccessible disk is reconstructed by allocating a backup slice. Due to the allocation of backup slices, idle storage spaces in storage system 120 are consumed. In some cases, a new disk (sometimes referred to as a "third disk") may be added to storage system 120 after data reconstruction is completed. Such disk may be referred to as a supplementary disk. Due to the consumption by data reconstruction, backup slices of directly backupable RAIDs associated with the anchor disk may be consumed, and as a result, the backup slices need to be supplemented.

In some embodiments, after a new disk is added to storage system 120, it is necessary to select a new anchor disk. In addition, as mentioned above, after a disk is added to storage system 120, storage management system 110 will also perform a re-striping operation on the new disk in storage system 120, so as to redistribute the originally allocated slices in multiple disks to the multiple existing disks and the new disk to achieve uniform distribution of these disks. Depending on the selection of the new anchor disk and the result of re-striping, storage management system 110 also needs to perform corresponding slice allocation adjustments.

In some embodiments, if the inaccessible disk is the anchor disk, a new anchor disk needs to be determined from the new disk and the existing accessible disks. If an existing disk is determined as the anchor disk, a backup slice can be allocated to the RAID associated with the new anchor disk through a re-striping process. Specifically, storage management system 110 may respectively allocate a plurality of backup slices from the new disk to a plurality of RAIDs associated with the new anchor disk, and storage slices used for storing information in these RAIDs are located in the new anchor disk. When performing re-striping on the new disk in storage system 120, a plurality of backup slices allocated in the new disk are uniformly re-striped to current accessible disks of storage system 120, including the new disk.

Figure 8A:
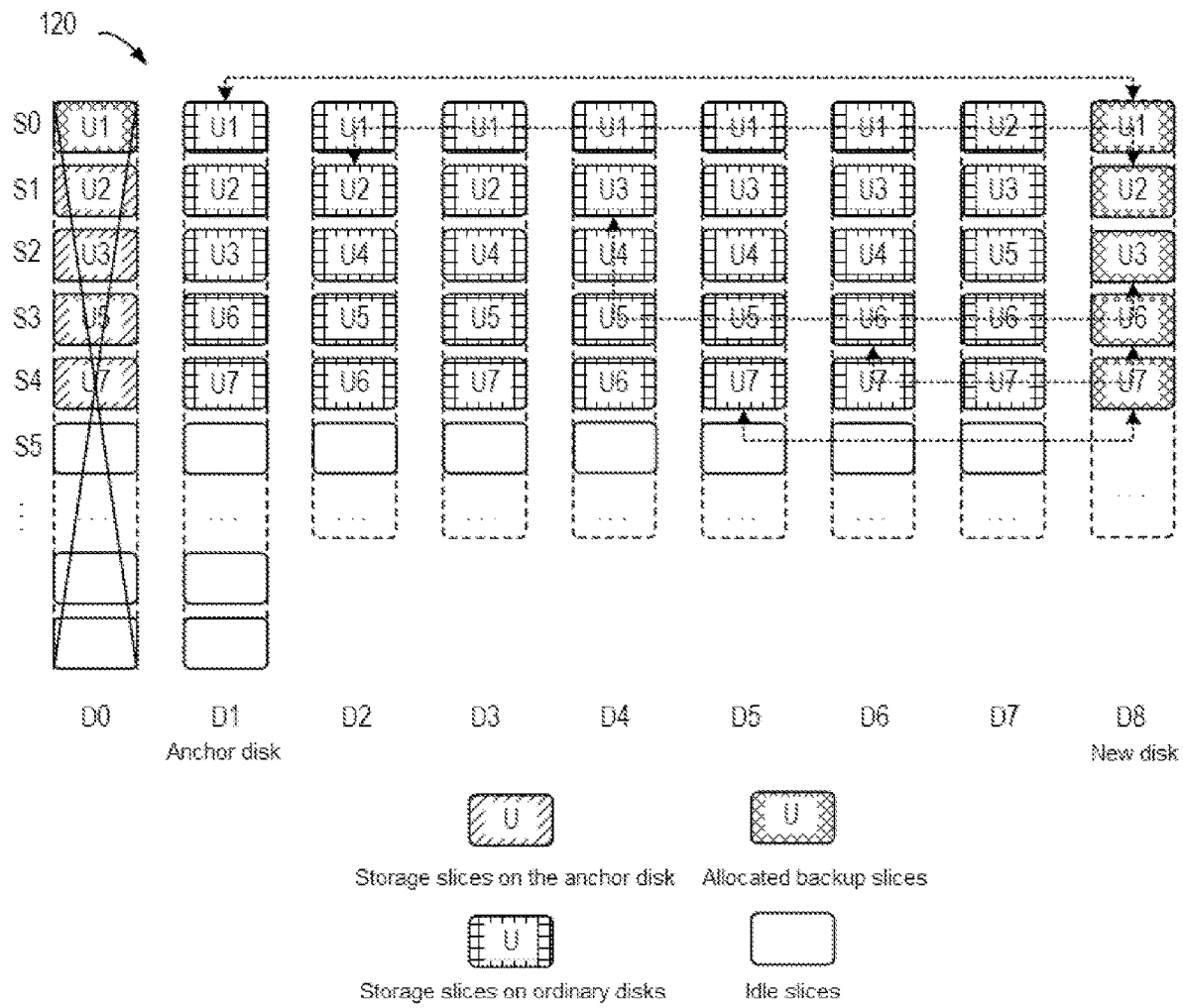
FIG. 8A shows an example of adjusting backup slices when adding a new disk after data reconstruction according to some embodiments of the present disclosure.

FIG. 8A shows an example of adjusting backup slices when adding a new disk after data reconstruction according to some embodiments of the present disclosure. Assume that after anchor disk D0 fails and data reconstruction is performed, disk D8 is added to storage system 120. Disk D1 is selected as the new anchor disk due to its relatively high storage capacity. Storage management system 110 may allocate a plurality of slices in disk D8 as respective backup slices for RAID 1, RAID 2, RAID 3, RAID 6, and RAID 7 that are associated with anchor disk D1. In a re-striping process, storage management system 110 re-stripes all backup slices in disk D8 to other disks, so as to achieve uniform distribution of the backup slices. For example, backup slice DS(8, 0) is re-striped to slice DS(1, 0). In this way, slice DS(1, 0) is referred to as the backup slice of directly backupable RAID 1; and backup slice DS(8, 1) is re-striped to slice DS(2, 1). In this way, slice DS(2, 1) is referred to as the backup slice of directly backupable RAID 2, and so on; similar operations are respectively performed on backup slices DS(8, 2), DS(8, 3), and DS(8, 4) to allocate backup slices for RAID 3, RAID 6, and RAID 7.

Figure 8B:
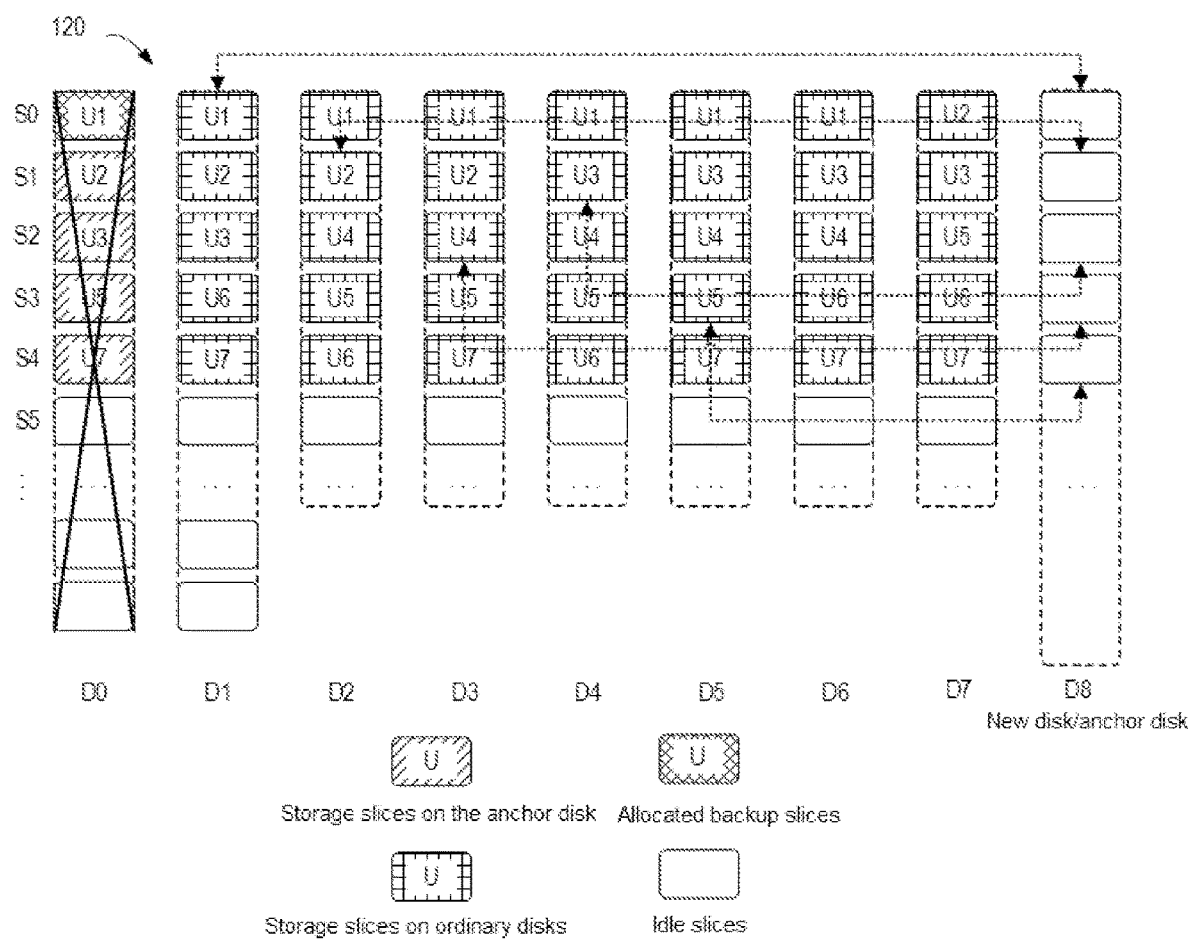
FIG. 8B shows another example of adjusting backup slices when adding a new disk after data reconstruction according to some embodiments of the present disclosure.

In some embodiments, if the new disk is selected as the anchor disk, storage management system 110 may also determine the re-striping of slices to ensure that the RAID associated with the new disk is allocated with a backup slice. Specifically, storage management system 110 may re-stripe a storage slice allocated for storing information in an accessible disk of storage system 120 to a slice in the new disk. Storage management system 110 may migrate the information stored in the storage slice to the slice in the newly added disk, and then determine the storage slice as a backup slice of a RAID that includes the slice. FIG. 8B shows another example of adjusting backup slices when adding a new disk after data reconstruction according to some embodiments of the present disclosure.

In FIG. 8B, it is assumed that after anchor disk D0 fails and data reconstruction is performed, disk D8 is added to storage system 120. Disk D8 is determined as the anchor disk due to its relatively high storage capacity. If storage slice DS(1, 0) allocated to RAID 1 in disk D1 is re-striped to slice DS(8, 0) of disk D8, storage management system 110 may migrate the information in storage slice DS(1, 0) to slice DS(8, 0), and mark slice DS(1, 0) as a backup slice of RAID 1. Similarly, similar operations can be performed for slice DS(2, 1) of disk D2, slice DS(3, 2) of disk D3, slice DS(4, 1) of disk D4, and slice DS(5, 4) of disk D5.

Although the above only discusses the embodiment of disk supplementation after an anchor disk is inaccessible and data reconstruction is performed, a DNA may allocate slices in a similar manner if a new disk is added as a supplement into the storage system after an ordinary disk is inaccessible and data reconstruction is performed, to ensure that a RAID associated with the current anchor disk is allocated with a backup slice. In this way, these backup slices can be used to deal with the next disk failure or offline due to other reasons.

In the example described above, a backup slice is allocated for a RAID allocated with the anchor disk. In other embodiments, two or more backup slices may also be allocated for the RAID allocated with the anchor disk. The number of backup slices may be related to the type of the RAID. For example, if the RAID type is 4+2 RAID 6, two backup slices can be allocated. The allocation mode and usage mode of the two backup slices are similar to the embodiments discussed above. The allocation of two or more backup slices can support data reconstruction when two or more disks are inaccessible.

Figure 9:
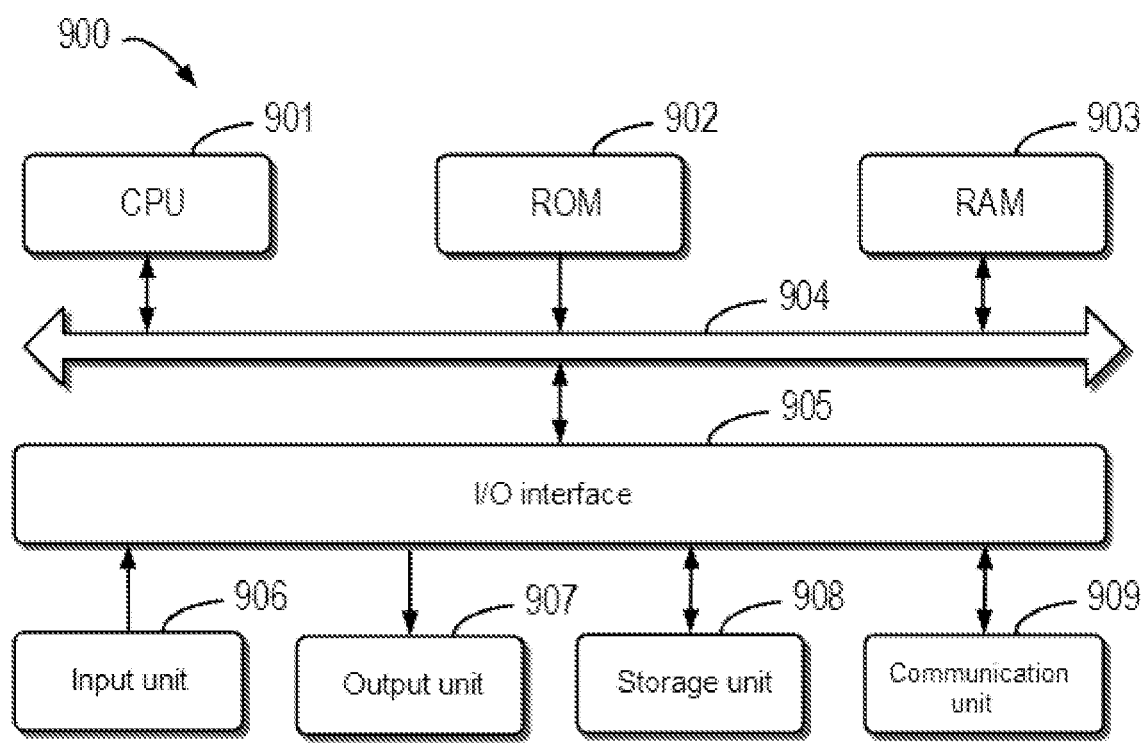
FIG. 9 shows a schematic block diagram of a device that may be configured to implement the embodiments of the present disclosure.

FIG. 9 schematically shows a block diagram of device 900 that can be configured to implement an embodiment of the present disclosure. As shown in FIG. 9, device 900 includes central processing unit (CPU) 901 that may perform various appropriate actions and processing according to a computer program instruction stored in read-only memory (ROM) 902 or a computer program instruction loaded from storage unit 908 into random access memory (RAM) 903. Various programs and data required for the operation of device 900 may also be stored in RAM 903. CPU 901, ROM 902, and RAM 903 are connected to one another through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices through a computer network such as the Internet and/or various telecommunication networks.

The various processes and processing described above, such as method 300, may be performed by processing unit 901. For example, in some embodiments, method 300 may be implemented as a computer software program that is tangibly included in a machine-readable medium such as storage chunk 908. In some embodiments, part or all of the computer program may be loaded and/or installed onto device 900 via ROM 902 and/or communication unit 909. One or more steps of method 300 described above may be performed when the computer program is loaded into RAM 903 and executed by CPU 901.

As used herein, the term "include" and similar terms thereof should be understood as open-ended inclusion, i.e., "including but not limited to." The term "based on" should be understood as "based at least in part on." The term "one embodiment" or "the embodiment" should be understood as "at least one embodiment." The terms "first," "second," and the like may refer to different or identical objects. Other explicit and implicit definitions may also be included below.

As used herein, the term "determine" encompasses a variety of actions. For example, "determine" may include operating, computing, processing, exporting, surveying, searching (for example, searching in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

It should be noted that the embodiments of the present disclosure may be implemented by hardware, software, or a combination of software and hardware. The hardware part can be implemented using dedicated logic; the software part can be stored in a memory and executed by an appropriate instruction execution system, such as a microprocessor or dedicated design hardware. Those skilled in the art can understand that the above-mentioned devices and methods can be implemented by using computer-executable instructions and/or by being included in processor control code which, for example, is provided on a programmable memory or a data carrier such as an optical or electronic signal carrier.

In addition, although the operations of the method of the present disclosure are described in a specific order in the drawings, this does not require or imply that these operations must be performed in the specific order, or that all the operations shown must be performed to achieve the desired result. Rather, the order of execution of the steps depicted in the flow charts can be changed. Additionally or alternatively, some steps may be omitted, multiple steps may be combined into one step for execution, and/or one step may be decomposed into multiple steps for execution. It should also be noted that features and functions of two or more apparatuses according to the present disclosure may be embodied in one apparatus. On the contrary, features and functions of one apparatus described above can be embodied by further dividing the apparatus into multiple apparatuses.

Although the present disclosure has been described with reference to several specific embodiments, it should be understood that the present disclosure is not limited to the specific embodiments disclosed. The present disclosure is intended to cover various modifications and equivalent arrangements included within the spirit and scope of the appended claims.

The invention claimed is:

1. A method for storage management, comprising:
   selecting a first disk from a plurality of disks in a storage system as an anchor disk;
   allocating a first backup slice from the plurality of disks to a redundant array of independent disks (RAID) associated with the first disk, the first RAID comprising at least a slice allocated from the first disk; and
   if it is detected that there is an inaccessible disk in the plurality of disks, determining a backup slice for a slice of the inaccessible disk based on the allocation of the first backup slice to the first RAID, for use in data reconstruction of the inaccessible disk.

2. The method according to claim 1, wherein selecting the first disk comprises:
   selecting the first disk based on corresponding storage capacities of the plurality of disks, a storage capacity of the first disk being greater than that of at least one other disk in the plurality of disks.

3. The method according to claim 1, wherein the first RAID comprises at least a storage slice allocated from the first disk for storing information and the first backup slice allocated from a disk other than the first disk among the plurality of disks, or
   wherein the first RAID comprises at least the first backup slice allocated from the first disk and a storage slice allocated, from a disk other than the first disk among the plurality of disks, for storing information.

4. The method according to claim 1, wherein determining a backup slice for a slice of the inaccessible disk comprises:
   if it is detected that there is an inaccessible disk in the plurality of disks, determining a degraded RAID, the degraded RAID comprising a first storage slice allocated from the inaccessible disk for storing information; and
   if it is determined that the degraded RAID does not comprise the first RAID and the inaccessible disk is not the first disk, determining whether an unallocated idle slice in the plurality of disks can be allocated as a backup slice for the first storage slice;
   if it is determined that there is no unallocated idle slice in the plurality of disks that can be allocated as a backup slice for the first storage slice, determining a backup slice for the first storage slice based on the first backup slice allocated to the first RAID.

5. The method according to claim 4, wherein determining a backup slice for the first storage slice based on the first backup slice comprises:
   if it is determined that the first backup slice is allocated from the first disk, allocating the first backup slice as the backup slice for the first storage slice;
   if it is determined that the first backup slice is allocated from a disk other than the first disk among the plurality of disks and it is determined that the first RAID comprises a second storage slice allocated from the first disk for storing information, migrating information stored in the second storage slice to the first backup slice; and
   allocating the second storage slice as the backup slice for the first storage slice.

6. The method according to claim 4, wherein determining a backup slice for a slice of the inaccessible disk further comprises:
   if it is determined that the degraded RAID comprises the first RAID, determining the first backup slice allocated to the first RAID as the backup slice for the first storage slice.

7. The method according to claim 1, further comprising:
   storing metadata for the first RAID, the metadata marking the first RAID as directly backupable and marking the first backup slice allocated to the first RAID,
   wherein determining a backup slice for the first storage slice based on the first backup slice comprises: using the metadata to determine the backup slice for the first storage slice.

8. The method according to claim 1, further comprising:
   if it is determined that a second disk is added to the storage system, determining whether the second disk is selected as the anchor disk;
   if it is determined that the second disk is selected as the anchor disk, determining a second RAID associated with the second disk based on a result of re-striping of the second disk in the storage system, the second RAID comprising a second slice re-striped from a third slice in the plurality of disks into the second disk;
   if it is determined that the third slice is a storage slice allocated from the first disk for storing information, migrating information stored in the third slice to the second slice;
   if it is determined that the third slice is a storage slice allocated, from a disk other than the first disk among the plurality of disks, for storing information, migrating the information stored in the third slice to the second slice and determining the third slice as a backup slice for the second RAID; and
   if it is determined that the third slice is a backup slice that has been allocated to the second RAID, determining the second slice as the second backup slice for the second RAID.

9. The method according to claim 8, wherein determining whether the second disk is selected as the anchor disk comprises:
   comparing a storage capacity of the second disk with that of the first disk; and if it is determined that the storage capacity of the second disk exceeds that of the first disk by a predetermined threshold capacity, determining that the second disk is selected as the anchor disk.

10. The method according to claim 8, wherein the first RAID comprises at least a second storage slice allocated from the first disk for storing information, and the method further comprises:
if it is determined that the first disk remains as the anchor disk, determining whether the second storage slice is re-striped to a third slice in the second disk; and
if it is determined that the second storage slice is re-striped to the third slice in the second disk, releasing the allocation of the first backup slice.

11. The method according to claim 8, further comprising:
if it is determined that the first disk remains as the anchor disk, determining whether the first backup slice allocated for the first RAID is re-striped to a third slice in the second disk;
if the first backup slice is re-striped to the third slice in the second disk, determining the third slice in the second disk as a backup slice for the first RAID; and
releasing the allocation of the first backup slice.

12. The method according to claim 1, wherein the inaccessible disk is the first disk, and the method further comprises:
if it is determined that a third disk is added to the storage system after the data reconstruction is completed, determining whether the third disk or an accessible fourth disk among the plurality of disks is selected as the anchor disk;
if it is determined that the fourth disk is selected as the anchor disk, allocating respectively a plurality of backup slices from the third disk to a plurality of RAIDs associated with the fourth disk, the plurality of RAIDs comprising at least a storage slice allocated from the fourth disk for storing information; and
performing re-striping on the third disk in the storage system to uniformly re-stripe the plurality of backup slices to the third disk and accessible disks among the plurality of disks.

13. The method according to claim 12, further comprising:
if it is determined that the third disk is selected as the anchor disk, re-striping a third storage slice allocated, from the accessible disks among the plurality of disks, for storing information to a slice of the third disk, the third storage slice being allocated to a third RAID;
migrating information stored in the third storage slice to the slice of the third disk; and
marking the third storage slice as a backup slice comprising the third RAID.

14. An electronic device, comprising:
at least one processor; and
at least one memory storing computer program instructions, wherein the at least one memory and the computer program instructions are configured to cause, together with the at least one processor, the electronic device to perform actions comprising:
selecting a first disk from a plurality of disks in a storage system as an anchor disk;
allocating a first backup slice from the plurality of disks to a redundant array of independent disks (RAID) associated with the first disk, the first RAID comprising at least a slice allocated from the first disk; and
if it is detected that there is an inaccessible disk in the plurality of disks, determining a backup slice for a slice of the inaccessible disk based on the allocation of the first backup slice to the first RAID, for use in data reconstruction of the inaccessible disk.

15. The device according to claim 14, wherein selecting the first disk comprises:
selecting the first disk based on corresponding storage capacities of the plurality of disks, a storage capacity of the first disk being greater than that of at least one other disk in the plurality of disks.

16. The device according to claim 14, wherein the first RAID comprises at least a storage slice allocated from the first disk for storing information and the first backup slice allocated from a disk other than the first disk among the plurality of disks, or
wherein the first RAID comprises at least the first backup slice allocated from the first disk and a storage slice allocated, from a disk other than the first disk among the plurality of disks, for storing information.

17. The device according to claim 14, wherein determining a backup slice for a slice of the inaccessible disk comprises:
if it is detected that there is an inaccessible disk in the plurality of disks, determining a degraded RAID, the degraded RAID comprising a first storage slice allocated from the inaccessible disk for storing information; and
if it is determined that the degraded RAID does not comprise the first RAID and the inaccessible disk is not the first disk, determining whether an unallocated idle slice in the plurality of disks can be allocated as a backup slice for the first storage slice;
if it is determined that there is no unallocated idle slice in the plurality of disks that can be allocated as a backup slice for the first storage slice, determining a backup slice for the first storage slice based on the first backup slice allocated to the first RAID.

18. The device according to claim 17, wherein determining a backup slice for the first storage slice based on the first backup slice comprises:
if it is determined that the first backup slice is allocated from the first disk, allocating the first backup slice as the backup slice for the first storage slice;
if it is determined that the first backup slice is allocated from a disk other than the first disk among the plurality of disks and it is determined that the first RAID comprises a second storage slice allocated from the first disk for storing information, migrating information stored in the second storage slice to the first backup slice; and
allocating the second storage slice as the backup slice for the first storage slice.

19. The device according to claim 17, wherein determining a backup slice for a slice of the inaccessible disk further comprises:
if it is determined that the degraded RAID comprises the first RAID, determining the first backup slice allocated to the first RAID as the backup slice for the first storage slice.

20. The device according to claim 14, wherein the actions further comprise:
storing metadata for the first RAID, the metadata marking the first RAID as directly backupable and marking the first backup slice allocated to the first RAID,
wherein determining a backup slice for the first storage slice based on the first backup slice comprises: using the metadata to determine the backup slice for the first storage slice.

21. The device according to claim 14, wherein the actions further comprise:
- if it is determined that a second disk is added to the storage system, determining whether the second disk is selected as the anchor disk;
- if it is determined that the second disk is selected as the anchor disk, determining a second RAID associated with the second disk based on a result of re-striping of the second disk in the storage system, the second RAID comprising a second slice re-striped from a third slice in the plurality of disks into the second disk;
- if it is determined that the third slice is a storage slice allocated from the first disk for storing information, migrating information stored in the third slice to the second slice;
- if it is determined that the third slice is a storage slice allocated, from a disk other than the first disk among the plurality of disks, for storing information, migrating the information stored in the third slice to the second slice and determining the third slice as a backup slice for the second RAID; and
- if it is determined that the third slice is a backup slice that has been allocated to the second RAID, determining the second slice as the second backup slice for the second RAID.

22. The device according to claim 21, wherein determining whether the second disk is selected as the anchor disk comprises:
- comparing a storage capacity of the second disk with that of the first disk; and
- if it is determined that the storage capacity of the second disk exceeds that of the first disk by a predetermined threshold capacity, determining that the second disk is selected as the anchor disk.

23. The device according to claim 21, wherein the first RAID comprises at least a second storage slice allocated from the first disk for storing information, and the method further comprises:
- if it is determined that the first disk remains as the anchor disk, determining whether the second storage slice is re-striped to a third slice in the second disk; and
- if it is determined that the second storage slice is re-striped to the third slice in the second disk, releasing the allocation of the first backup slice.

24. The device according to claim 21, wherein the actions further comprise:
- if it is determined that the first disk remains as the anchor disk, determining whether the first backup slice allocated for the first RAID is re-striped to a third slice in the second disk;
- if the first backup slice is re-striped to the third slice in the second disk, determining the third slice in the second disk as a backup slice for the first RAID; and
- releasing the allocation of the first backup slice.

25. The device according to claim 14, wherein the inaccessible disk is the first disk, and the actions further comprise:
- if it is determined that a third disk is added to the storage system after the data reconstruction is completed, determining whether the third disk or an accessible fourth disk among the plurality of disks is selected as the anchor disk;
- if it is determined that the fourth disk is selected as the anchor disk, allocating respectively a plurality of backup slices from the third disk to a plurality of RAIDs associated with the fourth disk, the plurality of RAIDs comprising at least a storage slice allocated from the fourth disk for storing information; and
- performing re-striping on the third disk in the storage system to uniformly re-stripe the plurality of backup slices to the third disk and accessible disks among the plurality of disks.

26. The device according to claim 25, wherein the actions further comprise:
- if it is determined that the third disk is selected as the anchor disk, re-striping a third storage slice allocated, from the accessible disks among the plurality of disks, for storing information to a slice of the third disk, the third storage slice being allocated to a third RAID;
- migrating information stored in the third storage slice to the slice of the third disk; and
- marking the third storage slice as a backup slice comprising the third RAID.

27. A computer program product having a non-transitory computer readable medium which stores a set of instructions to perform storage management; the set of instructions, when carried out by computerized circuitry, causing the computerized circuitry to perform a method of:
- selecting a first disk from a plurality of disks in a storage system as an anchor disk;
- allocating a first backup slice from the plurality of disks to a redundant array of independent disks (RAID) associated with the first disk, the first RAID comprising at least a slice allocated from the first disk; and
- if it is detected that there is an inaccessible disk in the plurality of disks, determining a backup slice for a slice of the inaccessible disk based on the allocation of the first backup slice to the first RAID, for use in data reconstruction of the inaccessible disk.

* * * * *